United States Patent
Lee et al.

(10) Patent No.: US 11,066,970 B2
(45) Date of Patent: Jul. 20, 2021

(54) TUBE-PIN ASSEMBLY FOR HEAT EXCHANGER OF VEHICLE

(71) Applicants: Hyundai Motor Company, Seoul (KR); Kia Motors Corporation, Seoul (KR)

(72) Inventors: Dong Young Lee, Gyeonggi-do (KR); Sung Il Yoon, Seoul (KR); Seok Ha, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 58 days.

(21) Appl. No.: 16/540,679

(22) Filed: Aug. 14, 2019

(65) Prior Publication Data

US 2020/0318511 A1  Oct. 8, 2020

(30) Foreign Application Priority Data

Apr. 8, 2019   (KR) .......................... 10-2019-0040549

(51) Int. Cl.
  *F01N 3/02* (2006.01)
  *F28F 1/40* (2006.01)
  *F28F 13/00* (2006.01)

(52) U.S. Cl.
  CPC .............. *F01N 3/0205* (2013.01); *F28F 1/40* (2013.01); *F28F 13/003* (2013.01)

(58) Field of Classification Search
  CPC .......... F01N 3/0205; F28F 1/40; F28F 13/003
  USPC ........................................................ 60/320
  See application file for complete search history.

(56) References Cited

U.S. PATENT DOCUMENTS

| | | | | |
|---|---|---|---|---|
| 3,097,074 A | * | 7/1963 | Johnson | F01N 3/2053 60/277 |
| 3,610,809 A | * | 10/1971 | Eigenbrod | H01B 7/29 174/15.5 |
| 6,694,727 B1 | * | 2/2004 | Crawley | F01N 3/025 60/295 |
| 6,969,505 B2 | * | 11/2005 | Tonkovich | B01J 19/0093 423/648.1 |
| 7,234,514 B2 | * | 6/2007 | Vogel | F28F 3/12 165/170 |
| 7,896,935 B2 | * | 3/2011 | Tonkovich | F28F 3/048 422/603 |
| 8,580,211 B2 | * | 11/2013 | Tonkovich | B01J 19/0093 422/603 |
| 9,291,403 B2 | * | 3/2016 | Hisanaga | F28F 1/40 |
| 9,581,062 B2 | * | 2/2017 | Hamad | F01N 3/00 |

(Continued)

FOREIGN PATENT DOCUMENTS

| | | | | |
|---|---|---|---|---|
| DE | 102006057662 A1 | * | 6/2008 | F28F 9/02 |
| JP | 2001033011 A | * | 2/2001 | |

(Continued)

*Primary Examiner* — Thai Ba Trieu
(74) *Attorney, Agent, or Firm* — Mintz Levin Cohn Ferris Glovsky and Popeo, P.C.; Peter F. Corless

(57) ABSTRACT

A tube-pin assembly for a heat exchanger of a vehicle includes a housing having an inlet into which exhaust gas flows; a plurality of tubes arranged inside the housing to provide a passage through which the exhaust gas flows; and cooling pins provided between the tubes to provide a coolant passage through which coolant flows, where a foamed metal made of a porous material is provided inside at least one of the tubes.

10 Claims, 3 Drawing Sheets

(56) References Cited

U.S. PATENT DOCUMENTS

| | | | | |
|---|---|---|---|---|
| 9,664,087 B2 * | 5/2017 | Sloss | ............... | F01N 13/087 |
| 2003/0010481 A1 * | 1/2003 | Northrop | ............ | F28F 1/325 |
| | | | | 165/168 |
| 2005/0272965 A1 * | 12/2005 | Watson | ............. | C01B 3/386 |
| | | | | 422/600 |
| 2009/0208393 A1 * | 8/2009 | Wenzel | ........... | F01N 3/0835 |
| | | | | 423/213.2 |
| 2010/0154396 A1 * | 6/2010 | Hahnl | ............. | F01N 5/025 |
| | | | | 60/320 |

FOREIGN PATENT DOCUMENTS

| | | | | | |
|---|---|---|---|---|---|
| JP | 2004132222 A | * | 4/2004 | | |
| JP | 2005226560 A | * | 8/2005 | ............ | F01N 9/00 |
| JP | 2006200497 A | * | 8/2006 | | |

\* cited by examiner

TUBE-PIN ASSEMBLY FOR HEAT EXCHANGER OF VEHICLE

CROSS-REFERENCE TO RELATED APPLICATION

This application claims under 35 U.S.C. § 119(a) the benefit of Korean Patent Application No. 10-2019-0040549 filed on Apr. 8, 2019, the entire contents of which are incorporated herein by reference.

BACKGROUND

(a) Technical Field

The present disclosure relates to a tube-pin assembly for a heat exchanger of a vehicle, more particularly, to the tub-pin assembly for cooling exhaust gas by using a tube containing a foamed metal.

(b) Description of the Related Art

Tubes and pins are used in various types of heat exchangers used to cool the exhaust gas discharged from an engine of a vehicle. Generally, the tube is a plate type having a cavity therein, and the pin is a bent plate type. The heat exchanger cools a high-temperature exhaust gas flowing in the tube by using the coolant flowing outside the tube.

Conventionally, a flat pin and a wavy pin are applied to a heat exchanger and a cooler pin for a vehicle. However, there has been a problem in that the flat pin, the wavy pin, etc. are deteriorated in cooling performance because the contact area of the exhaust gas is limited in area (i.e., not wide). In addition, there has been a problem in that welding is performed in order to dispose the cooler pin in the tube, which causes corrosion of the tube during welding and deterioration of durability of the tube.

The above information disclosed in this Background section is only for enhancement of understanding of the background of the disclosure and therefore it can contain information that does not form the prior art that is already known in this country to a person of ordinary skill in the art.

SUMMARY

The present disclosure provides a tube-pin assembly for a heat exchanger of a vehicle, in which the tube-pin assembly includes a tube containing a foamed metal.

An object of the present disclosure is to provide a tube-pin assembly capable of adjusting the degree of cooling of the exhaust gas according to the temperature of the exhaust gas.

A tube-pin assembly according to an embodiment of the present disclosure includes a housing having an inlet into which exhaust gas flows, a plurality of tubes arranged inside the housing to provide a passage through which the exhaust gas flows, and cooling pins provided between the tubes to provide a coolant passage through which coolant flows, and a foamed metal made of a porous material is provided inside at least one of the tubes.

According to an example, the tubes include a first tube having the foamed metal provided therein and a second tube including a tube region contacting the coolant and a cooling pin region of a bent structure provided in the tube region.

According to an example, the tube region and the cooling pin region are integrally formed with each other.

According to an example, a partition for dividing the inlet into a first inlet and a second inlet is provided therein.

According to an example, the first inlet and the second inlet are defined to have different opening areas from each other.

According to an example, the tubes include a first tube having the foamed metal provided therein and a second tube having a cooling pin region of a bent structure provided therein, the first inlet flows the exhaust gas toward the first tube, and the second inlet flows the exhaust gas toward the second tube.

According to an example, the first inlet is defined by an opening area greater than the second inlet.

According to an example, the front end of the inlet is provided with a bypass valve for determining a flow passage of the exhaust gas, and the bypass valve is controlled according to the temperature of the exhaust gas.

According to an example, the bypass valve is controlled so that the exhaust gas flows toward the second inlet when the temperature of the exhaust gas is lower than a predetermined temperature.

According to an example, the bypass valve is completely opened when the temperature of the exhaust gas is higher than a predetermined temperature so that the exhaust gas flows in proportion to the opening area of each of the first inlet and the second inlet.

According to an example, the bypass valve is controlled so that the exhaust gas flows toward the first inlet when the temperature of the exhaust gas is higher than a predetermined temperature.

According to an embodiment of the present disclosure, the inside of at least one of the tubes can be provided with a foamed metal made of a porous material. As the first tube containing the foamed metal is applied to the heat exchanger, the cooling performance of the exhaust gas can be enhanced. In addition, since the foamed metal is generally lighter than the pin structure provided in a tube, the total weight of the tube-pin assembly can be reduced. Therefore, when the tube-pin assembly according to an embodiment of the present disclosure is applied to the heat exchanger, the fuel efficiency of the vehicle can be enhanced.

The second tube according to an embodiment of the present disclosure can be formed by bending one metal plate several times without performing the welding process. Therefore, problems of corrosion and durability deterioration that can occur according to the welding process cannot be caused in the second tube.

In addition, the tube and the pin according to an embodiment of the present disclosure can have an integral structure. Therefore, a separate assembly process can be omitted, and the process of manufacturing the tube can be simplified.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1:
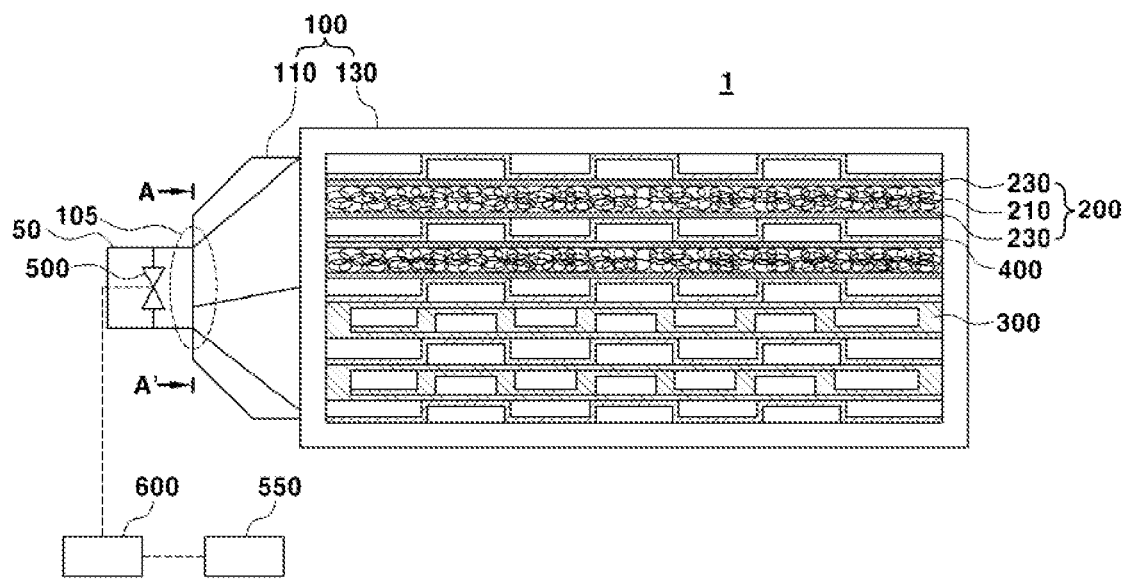
FIG. 1 is a diagram illustrating a tube-pin assembly according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the drawings, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The advantages and features of the present disclosure, and a method for achieving them will become apparent with reference to the embodiments described in detail below together with the accompanying drawings. The present disclosure can, however, be embodied in many different forms and should not be construed as being limited to the embodiments set forth herein, and rather, these embodiments are provided so that this disclosure will be thorough and complete, and will fully convey the scope of the disclosure to those skilled in the art to which the present disclosure pertains, and the present disclosure is only defined by the scope of the claims. The same reference numerals refer to the same elements throughout the specification.

FIG. 1 is a diagram illustrating a tube-pin assembly according to an embodiment of the present disclosure.

Referring to FIG. 1, a tube-pin assembly 1 may include a housing 100, a first tube 200, a second tube 300, a cooling pin 400, a bypass valve 500, and a control unit 600. The tube-pin assembly 1 may be applied to various types of heat exchangers applied to a vehicle. For example, the types of heat exchangers may include a radiator for exchanging heat with air, a charge air cooler, a condenser, an automatic transmission fluid for dissipating heat (or absorbing heat) through heat exchange with coolant, a warmer, an exhaust gas recirculator, a cooler, and a transmission oil cooler.

The housing 100 may include an inlet end 110 at which an inlet 105 for receiving exhaust gas is defined, and a body part 130 connected with the inlet end 110 and for defining a space in which the first tube 200 and a second tube 300 are provided. The inlet end 110 maybe connected to an exhaust line 50 through which the exhaust gas flows to the tube-pin assembly 1. The housing 100 may include a discharge port (not illustrated) through which the exhaust gas is discharged.

The first tube 200 may include a foamed metal 210 made of a porous material and the tube 230 defining a space in which the foamed metal 210 is provided. The first tube 200 maybe provided in plural. The first tube 200 maybe a passage through which exhaust gas flows, and the outside of the first tube 200 maybe a coolant passage through which coolant flows. Therefore, heat exchange of the exhaust gas may be performed in the first tube 200.

The foamed metal 210 may have a cell structure that contains a solid metal in which most of the volume is composed of gas-filled pores. The foamed metal 210 may include a large number of pores, and the size of the pores may range from about 0.05 mm to about 1 mm, and alternatively, may be greater than about 0.1 mm. For example, the porosity of the foamed metal 210 may be greater than or equal to 0.9, and the density thereof maybe from 0.2 g/cm$^3$ to 0.4 g/cm$^3$. Therefore, the foamed metal 210 may be significantly lighter than the tube 230, and the porous structure may fill with air therein, such that sound-proofing and sound insulation performance may be excellent. In addition, the foamed metal 210 may have a surface area ratio of 790 m$^2$/m$^3$ to 2,740 m$^2$/m$^3$ per unit volume, thereby having a large contact area with the tube 230. Since the foamed metal 210 of the present disclosure generally has a larger contact area with the tube 230 than the bent pin structure provided in the tube 230, the first tube 200 has a heat transfer coefficient higher than that of a general tube. As a result, the first tube 200 may be more satisfactory in cooling performance of the exhaust gas than a general tube.

The second tube 300 is an integral tube, and may include a cooling pin region (not illustrated) and a tube region (not illustrated). A structure of the second tube 300 will be described later. The second tube 300 maybe provided in plural. The second tube 300 maybe a passage through which exhaust gas flows, and the outside of the second tube 300 maybe a coolant passage through which coolant flows. Therefore, heat exchange of the exhaust gas may be performed in the second tube 300.

The first tube 200 may have a greater heat transfer coefficient than the second tube 300. This is because the inside of the first tube 200 is provided with the foamed metal 210 but the inside of the second tube 300 is provided with the cooling pin region (not illustrated) having a bent structure. That is, the area of contact between the tube 230 and the foamed metal 210 maybe greater than the area of contact between the cooling pin region (not illustrated) and the tube region (not illustrated).

The first tube 200 maybe disposed closer to the upper end than the second tube 300 based on the direction when the tube-pin assembly 1 is installed in the vehicle. The arrangement relationship of the first tube 200 and the second tube 300 is for guiding the exhaust gas having a higher temperature than the atmospheric temperature to flow toward the first tube 200 rather than the second tube 300. However, the relative arrangement between the first tube 200 and the second tube 300 may not be particularly limited thereto.

The cooling pin 400 maybe provided between the first tubes 200, between the second tubes 300, and between the first tube 200 and the second tube 300 adjacent to each other. The cooling pin 400 may constantly keep an interval between the first tubes 200, between the second tubes 300, and between the first tube 200 and the second tube 300 adjacent to each other. The cooling pin 400 maybe a passage through which coolant flows. The cooling pin 400 maybe formed by bending a single plate material into a zigzag shape.

The bypass valve 500 maybe disposed in the exhaust line 50 that flows the exhaust gas to the tube-pin assembly 1. The bypass valve 500 may control the opening direction and the opening amount based on the temperature of the exhaust gas.

The control unit 600 may control the opening direction and the opening amount of the bypass valve 500 based on the temperature of the exhaust gas. The control unit 600 maybe an Electronic Control Unit (ECU) mounted in the vehicle. A temperature sensor 550 for measuring the temperature of the exhaust gas maybe provided at the front end of the tube-pin assembly 1, and the control unit 600 may control the passage through which exhaust gas flows according to whether the temperature of the exhaust gas is higher or lower than a predetermined temperature. The predetermined temperature may be changed according to design choice.

According to an embodiment of the present disclosure, the inside of at least one of the tubes 200, 300 may be provided with the foamed metal 210 made of a porous material. That is, as the first tube 200 containing the foamed metal 210 is applied to the heat exchanger, the cooling performance of the exhaust gas may be enhanced. In addition, since the foamed metal 210 is generally lighter than the pin structure provided in the tube 230, the total weight of the tube-pin assembly 1 may be reduced. Therefore, when the first tube 200 is applied to the heat exchanger, the fuel efficiency of the vehicle may be enhanced.

Figure 2:
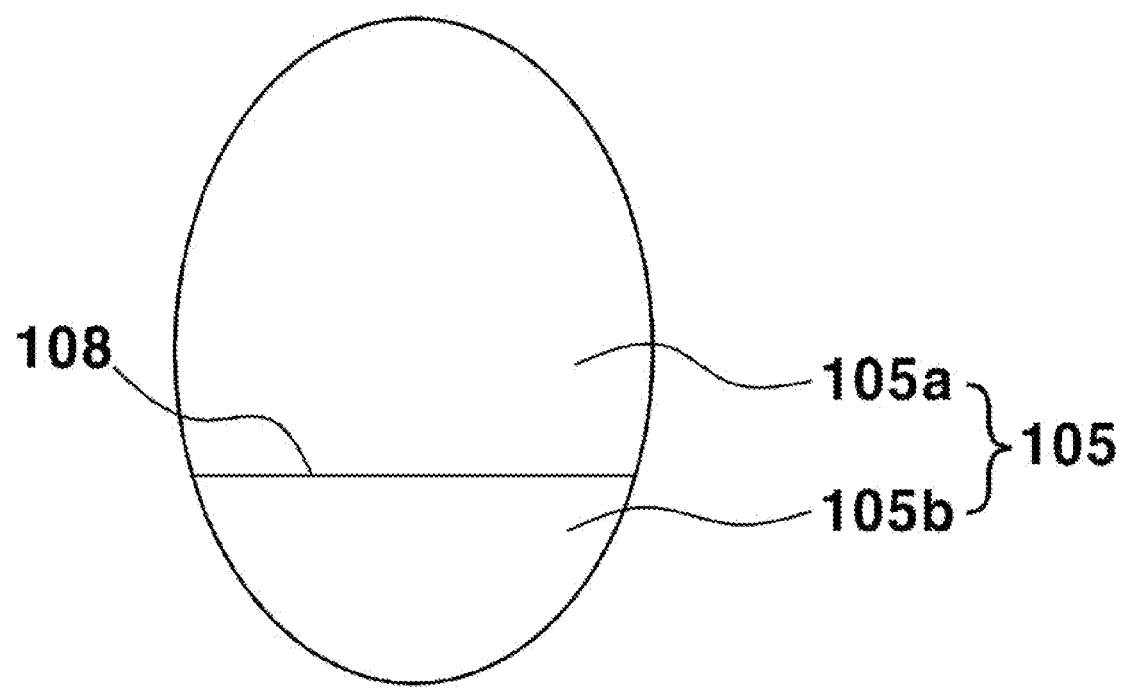
FIG. 2 is a cross-sectional diagram illustrating an inlet according to an embodiment of the present disclosure.

FIG. 2 is a cross-sectional diagram illustrating an inlet according to an embodiment of the present disclosure. FIG. 2 is a cross-sectional diagram taken along the line A-A' in FIG. 1.

Referring to FIGS. 1 and 2, a partition 108 may be provided to divide the inlet 105 into a first inlet 105a and a second inlet 105b. The partition 108 may divide the passage of the received exhaust gas into two passages. For example, the exhaust gas flowing through the first inlet 105a may flow into the first tubes 200, and the exhaust gas flowing through the second inlet 105b may flow into the second tubes 300. The first inlet 105a and the second inlet 105b may have different opening areas from each other. For example, the first inlet 105a may be defined as an opening area greater than the second inlet 105b.

The followability of the exhaust gas in the first tube 200 maybe lower than the followability of the exhaust gas in the second tube 300 because the foamed metal 210 having a large porosity is provided in the first tube 200. Therefore, the differential pressure within the first tube 200 may be greater than the differential pressure within the second tube 300. Specifically, a pressure difference between a portion of the first tube 200 adjacent to the inlet 105 and a portion of the first tube 200 adjacent to the outlet (not illustrated) may be greater than a pressure difference between a portion of the second tube 300 adjacent to the inlet 105 and a portion of the second tube 300 adjacent to the outlet (not illustrated). The amount of exhaust gas released toward the second tube 300 having a relatively small differential pressure may be greater than the amount of exhaust gas released toward the first tube 200 in a state where the bypass valve 500 has been completely opened. That is, the exhaust gas may flow into a region where the differential pressure is relatively small. Since the first inlet 105a has a larger opening area than the second inlet 105b, the amount of the exhaust gas flowing into the first inlet 105a and the second inlet 105b may be similar to each other in a state where the bypass valve 500 has been completely opened. That is, the partition 108 according to an embodiment of the present disclosure may have a configuration such that the first inlet 105a and the second inlet 105b are opened with different areas. Therefore, the amount of the exhaust gas flowing into each of the first tube 200 and the second tube 300 may be made similar in a state where the bypass valve 500 has been completely opened.

Figure 3:
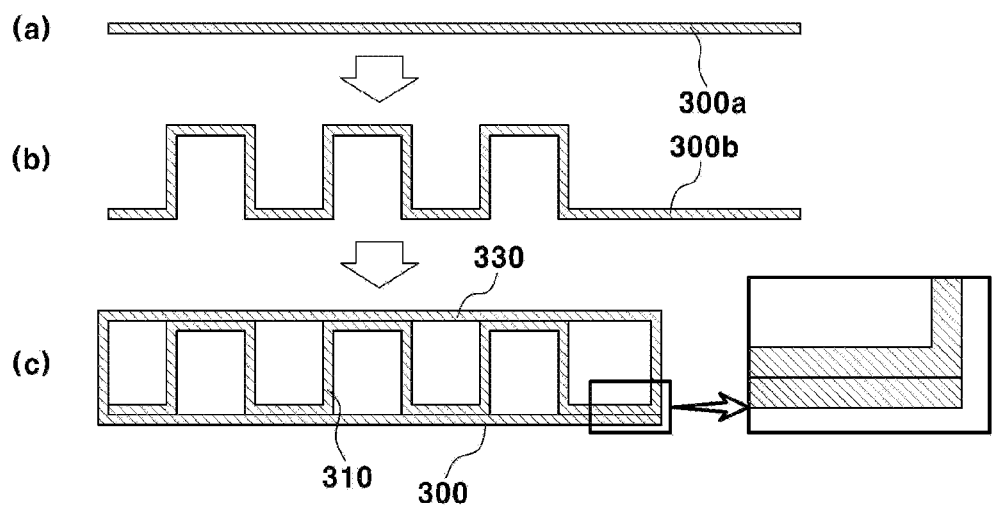
FIG. 3 is a diagram illustrating a method for manufacturing an integral tube according to an embodiment of the present disclosure.

FIG. 3 is a diagram illustrating a method for manufacturing an integral tube according to an embodiment of the present disclosure. In particular, FIG. 3 relates to a method for manufacturing the second tube 300 of FIG. 1.

Referring to FIG. 3, a plate-shaped metal plate 300a may be provided. The metal plate 300a maybe primarily bent so that the structure bent in a "⊏" shape is continuous. One end of the bent metal plate 300b maybe secondarily bent in order to surround the "⊏" shape bent structure. The second tube 300 maybe formed through brazing bonding without using a welding process.

The second tube 300 may include a cooling pin region 310 in which a structure bent in the "⊏" shape is continuous, and a tube region 330 surrounding the cooling pin region 310. The cooling pin region 310 may contact the exhaust gas, the inner surface of the tube region 330 may contact the exhaust gas, and the outer surface of the tube region 330 may contact the coolant. That is, the outer surface of the tube region 330 may contact the cooling pin 400.

The second tube 300 according to an embodiment of the present disclosure maybe formed by bending one metal plate several times without performing a welding process. Therefore, problems of corrosion and durability deterioration that may result from a conventional welding process may not be apparent in the second tube 300.

In addition, the second tube 300 according to an embodiment of the present disclosure may have an integral structure rather than a structure in which the cooling pin region 310 and the tube region 330 are separately formed and then coupled. Therefore, a separate assembly process may be omitted, and the process of manufacturing the second tube 300 may be simplified.

Figure 4:
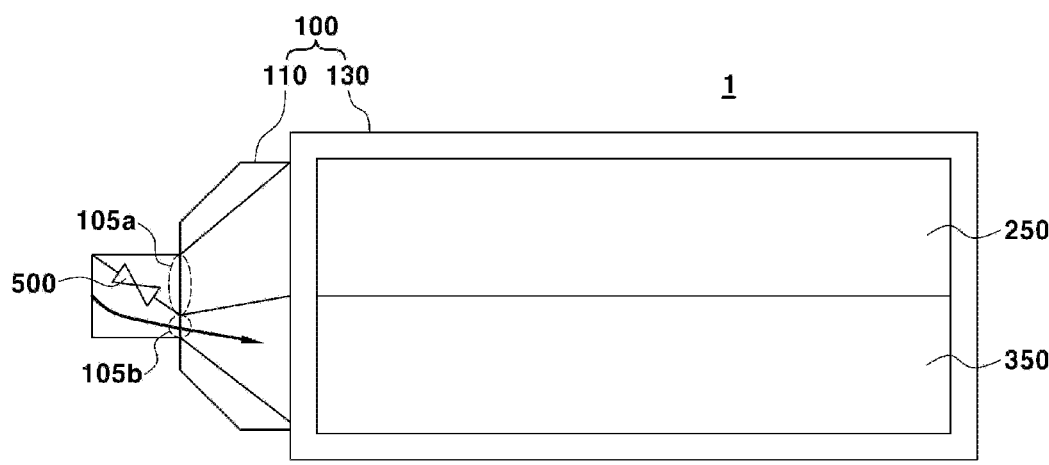
FIG. 4 is a diagram illustrating a method for controlling a bypass valve when an exhaust gas is low temperature according to an embodiment of the present disclosure.

FIG. 4 is a diagram for explaining a method for controlling a bypass valve when the exhaust gas is low temperature according to an embodiment of the present disclosure.

Referring to FIGS. 1 and 4, the opening direction of the bypass valve 500 may be controlled based on the temperature of the exhaust gas flowing into the tube-pin assembly 1. When the temperature of the exhaust gas is lower than a predetermined temperature, the control unit 600 controls the bypass valve 500 to flow the exhaust gas to the second inlet 105b. The exhaust gas passing through the second inlet 105b may flow into the second tube region 350 where the second tubes 300 are disposed. The cooling performance of the second tube 300 maybe lower than that of the first tube 200 due to the difference in heat transfer coefficients. However, when the temperature of the exhaust gas is lower than the predetermined temperature, it may not be necessary to excessively cool the exhaust gas. That is, when the temperature of the exhaust gas is lower than the predetermined temperature, the necessity of cooling the exhaust gas maybe low.

Figure 5:
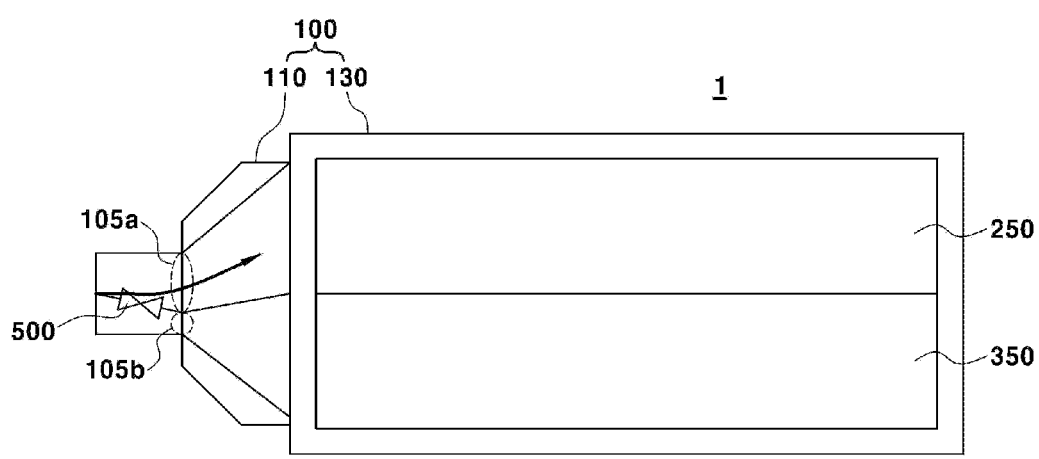
FIG. 5 is a diagram illustrating a method for controlling the bypass valve when the exhaust gas is high temperature according to an embodiment of the present disclosure.

FIG. 5 is a diagram for explaining a method for controlling the bypass valve when the exhaust gas is high temperature according to an embodiment of the present disclosure.

Referring to FIGS. 1 and 5, the opening direction of the bypass valve 500 may be controlled based on the temperature of the exhaust gas flowing into the tube-pin assembly 1. The control unit 600 controls the bypass valve 500 so that the exhaust gas may flow only to the first inlet 105a or flow toward the first inlet 105a and the second inlet 105b, when the temperature of the exhaust gas is higher than the predetermined temperature. The exhaust gas passing through the first inlet 105a may flow into a first tube region 250 where the first tubes 200 are disposed.

For example, when the temperature of the exhaust gas is higher than the predetermined temperature, the bypass valve 500 is completely opened so that the exhaust gas may evenly flow into the first tube 200 and the second tube 300 through the first inlet 105a and the second inlet 105b. At this time, the exhaust gas may evenly flow into the first tube region 250 and a second tube region 350 based on the area where the first inlet 105a and the second inlet 105b are opened and the differential pressure difference between the first tube 200 and the second tube 300.

When the temperature of the exhaust gas is higher than the predetermined temperature, it maybe highly necessary to cool the exhaust gas. Therefore, the control unit 600 may flow the exhaust gas to the first tube 200 side having a relatively excellent cooling performance or flow the exhaust gas to the first tube 200 and the second tube 300. As the exhaust gas flows to the first tube 200 side or the exhaust gas flows to the first tube 200 and the second tube 300, it is possible to cool the exhaust gas at a lower temperature than when the exhaust gas flows only to the second tube 300 side.

As described above, although the embodiments of the present disclosure have been described with reference to the accompanying drawings, it will be understood by those skilled in the art to which the present disclosure pertains that other specific forms may be embodied without changing the technical spirit or the essential features thereof. Therefore, it should be understood that the above-described embodiments are illustrative and are not restrictive in all respects.

What is claimed is:

1. A tube-pin assembly for a heat exchanger of a vehicle, comprising:
    a housing having an inlet into which exhaust gas flows;
    a plurality of tubes arranged inside the housing to provide a passage through which the exhaust gas flows; and
    cooling pins provided between the tubes to provide a coolant passage through which coolant flows,
    wherein a foamed metal made of a porous material is provided inside at least one of the plurality of tubes, and
    wherein the plurality of tubes comprises:
    a first tube having the foamed metal provided therein; and
    a second tube comprising a tube region contacting the coolant and a cooling pin region of a bent structure provided in the tube region.

2. The tube-pin assembly of claim 1, wherein the tube region and the cooling pin region are integrally formed with each other.

3. The tube-pin assembly of claim 1, wherein a partition for dividing the inlet into a first inlet and a second inlet is provided therein.

4. The tube-pin assembly of claim 3, wherein the first inlet and the second inlet are defined to have different opening areas from each other.

5. The tube-pin assembly of claim 3,
    wherein the first inlet flows the exhaust gas toward the first tube; and
    wherein the second inlet flows the exhaust gas toward the second tube.

6. The tube-pin assembly of claim 5, wherein the first inlet is defined by an opening area greater than the second inlet.

7. The tube-pin assembly of claim 5,
    wherein the front end of the inlet is provided with a bypass valve for determining a flow passage of the exhaust gas,
    wherein a temperature sensor for measuring a temperature of the exhaust gas is provided at the front end of the tube-pin assembly, and
    wherein the bypass valve is controlled by a controller according to the temperature of the exhaust gas.

8. The tube-pin assembly of claim 7, wherein the bypass valve is controlled by the controller so that the exhaust gas flows toward the second inlet when the temperature of the exhaust gas is lower than a predetermined temperature.

9. The tube-pin assembly of claim 7, wherein the bypass valve is completely opened by the controller when the temperature of the exhaust gas is higher than a predetermined temperature so that the exhaust gas flows in proportion to the opening area of each of the first inlet and the second inlet.

10. The tube-pin assembly of claim 7, wherein the bypass valve is controlled by the controller so that the exhaust gas flows toward the first inlet when the temperature id the exhaust gas is higher than a predetermined temperature.

\* \* \* \* \*